US008375255B2

(12) United States Patent
Wang et al.

(10) Patent No.: US 8,375,255 B2
(45) Date of Patent: Feb. 12, 2013

(54) DEVICE AND METHOD FOR DETECTING AND DIAGNOSING CORRELATED NETWORK ANOMALIES

(75) Inventors: Jia Wang, Randolph, NJ (US); Ashwin Lall, Rochester, NY (US); Ajay Mahimkar, Austin, TX (US); Jun Xu, Atlanta, GA (US); Jennifer Yates, Morristown, NJ (US); Qi Zhao, Short Hills, NJ (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 0 days.

(21) Appl. No.: 12/646,388

(22) Filed: Dec. 23, 2009

(65) Prior Publication Data

US 2011/0154119 A1 Jun. 23, 2011

(51) Int. Cl.
*G06F 11/00* (2006.01)
(52) U.S. Cl. ......... 714/47.1; 714/26; 714/38.14; 714/39
(58) Field of Classification Search .................... 714/26, 714/37, 38.14, 39, 45, 47.1, 47.2, 47.3; 709/224
See application file for complete search history.

(56) References Cited

U.S. PATENT DOCUMENTS

| | | | | |
|---|---|---|---|---|
| 5,913,036 A | * | 6/1999 | Brownmiller et al. | 709/224 |
| 6,205,563 B1 | * | 3/2001 | Lewis | 714/47.3 |
| 6,604,208 B1 | * | 8/2003 | Gosselin et al. | 714/4.12 |
| 6,966,015 B2 | * | 11/2005 | Steinberg et al. | 714/47.2 |
| 7,103,801 B2 | * | 9/2006 | Marilly et al. | 714/26 |
| 7,318,178 B2 | * | 1/2008 | Steinberg et al. | 714/47.2 |
| 7,631,222 B2 | * | 12/2009 | Hasan et al. | 714/26 |
| 7,661,032 B2 | * | 2/2010 | Eberbach et al. | 714/38.14 |
| 2004/0078683 A1 | * | 4/2004 | Buia et al. | 714/37 |
| 2005/0050377 A1 | * | 3/2005 | Chan et al. | 714/4 |
| 2006/0037075 A1 | * | 2/2006 | Frattura et al. | 726/22 |
| 2006/0041659 A1 | * | 2/2006 | Hasan et al. | 709/224 |
| 2006/0047807 A1 | * | 3/2006 | Magnaghi et al. | 709/224 |
| 2006/0069956 A1 | * | 3/2006 | Steinberg et al. | 714/25 |
| 2008/0168308 A1 | * | 7/2008 | Eberbach et al. | 714/26 |
| 2009/0049338 A1 | * | 2/2009 | Unnikrishnan et al. | 714/26 |
| 2009/0183023 A1 | * | 7/2009 | Rathunde et al. | 714/4 |

* cited by examiner

*Primary Examiner* — Joshua Lohn
(74) *Attorney, Agent, or Firm* — Fay Kaplun & Marcin, LLP

(57) ABSTRACT

A device detects and diagnoses correlated anomalies of a network. The device includes an anomaly detection module receiving a first data stream including an event-series related to the network. The anomaly detection module executes at least one algorithm to detect a potential anomaly in the event-series. The device further includes a correlating module receiving a second data stream including other event-series related to the network. The correlating module determines whether the potential anomaly is false and determines whether the potential anomaly is a true anomaly.

20 Claims, 3 Drawing Sheets

DEVICE AND METHOD FOR DETECTING AND DIAGNOSING CORRELATED NETWORK ANOMALIES

BACKGROUND

Network reliability and security are of top concern for operational networks. To ensure performance of a network, operators conventionally utilize a wide range of measurement tools that continuously monitor behavior or network parameters of various network elements. A large set of network data may be collected for troubleshooting performance issues. For example, the network data may include router configuration, simple network management protocol (SNMP) performance statistics (e.g., computer processing units (CPUs)/memory utilization, packet/byte counts, etc.), router command logs and error logs, routing update trees, end-to-end latency and loss measurements, traffic traces, etc. The data sources may contain information relating to the health of a network. The ability of detecting unusual events (i.e., anomalies) in the data sources may serve as a basis for troubleshooting network performance issues. Operators often conduct further investigation on anomalous events to obtain details for network diagnosis and planning, to provide guidelines for service provisioning and billing, to gain insights for future network architectural design, etc.

Conventional anomaly detection systems focus on analyzing a single data source (e.g., traffic volumes, routing updates, etc.) in isolation. However, this approach includes major drawbacks that prevent this approach to be used widely in network operations. For example, this approach is specifically designed or manually tuned based on available data in order to achieve desirable performance and domain knowledge in detecting anomalies which are usually required in operational practice. In another example, even with fine tuned parameters, this approach may still generate false alarms that require further manual examination. The lack of a scalable and automated network anomaly detection system forces operators to either rely on naïve approaches (e.g., simple thresholding) or manually conduct visual anomaly detection in a small scale. As a result, this greatly limits the ability that operators have to detect and diagnose large scale network events.

SUMMARY OF THE INVENTION

The exemplary embodiments describe a device that detects and diagnoses correlated anomalies of a network. The device comprises an anomaly detection module receiving a first data stream including an event-series related to the network. The anomaly detection module executes at least one algorithm to detect a potential anomaly in the event-series. The device further comprises a correlating module receiving a second data stream including other event-series related to the network. The correlating module determines whether the potential anomaly is false and determines whether the potential anomaly is a true anomaly.

DETAILED DESCRIPTION

Figure 1:
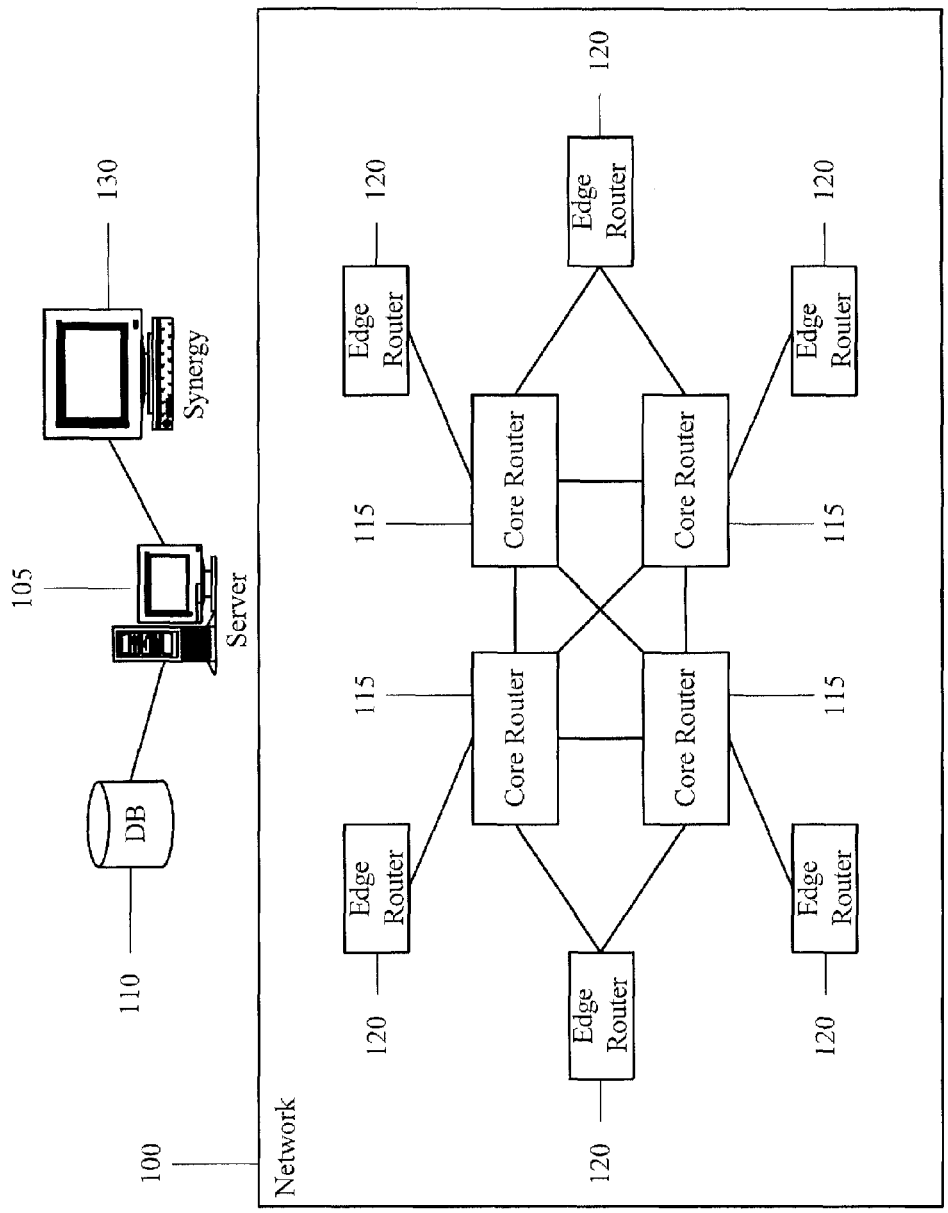
FIG. 1 shows a network according to an exemplary embodiment.

The exemplary embodiments may be further understood with reference to the following description and the appended drawings, wherein like elements are referred to with the same reference numerals. The exemplary embodiments describe a device and method for detecting and diagnosing correlated network anomalies. Specifically, the system may include a detection and diagnosis module (hereinafter "Synergy") that receives multiple data sources to detect and diagnose the correlated network anomalies. The correlated network anomalies, Synergy, the multiple data sources, and an associated method will be discussed in further detail below.

The exemplary embodiments provide for an automated system to detect and diagnose correlated network anomalies on heterogeneous data sources. According to the exemplary embodiments, the correlated network anomalies that may be addressed herein may have evidence in multiple network data sources because they are not isolated events and have a wider impact on network performance. In addition, the correlated network anomalies may reveal important insights on either root causes or potential impacts. Automatically detecting and diagnosing correlated network anomalies may enable operators to quickly react to prevent or reduce service disruption.

There are several issues to be addressed in the exemplary embodiments for an automated correlated anomaly detection and diagnosis system on heterogeneous data sources. While each of these issues are discussed in detail below, it is not required that each exemplary embodiment addresses all the discussed issues. First, network data sources may be very diverse in terms of data volumes, granularities, formats, semantics, etc. A significant drawback of conventional anomaly detection systems is that the system is often designed to work specifically for a single data source. Furthermore, there is a long parameter-tuning phase before the system may be used reliably. In addition, diversity in data types also pose further challenges on correlating anomalies in different data sources. The exemplary embodiments are flexible enough to handle diverse data sources and automatically tune parameters for each individual data source.

Second, the correlated anomaly detection system should have good accuracy with both a low false negative ratio and a low false alarm ratio. A low false negative ratio is required because missing any network anomaly event that may cause significant service disruptions may severely hinder efficiency. Assuming that network operational resources are limited, a low false positive ratio is also desirable so that true anomaly events may be focused thereon instead of false alarms. Conventional anomaly detection techniques have been shown to work reasonably well on certain data sources when specified conditions apply such as parameters being precisely tuned according to known anomaly signatures in data sources. However, in many data sources, the anomalies are often unknown, preventing the anomaly detection technique from working at all. The exemplary embodiments also address this issue.

Third, the correlated anomaly detection system should be robust in handling data with noise. Due to uncontrollable reasons, there may be missed polls in the data. This may be over time periods as short as a single measurement interval to as long as several hours. The missing data may also be caused solely by anomaly events in certain scenarios (e.g., high CPU utilization). Therefore, the system should function while providing meaningful results despite the missing data. The exemplary embodiments further address this issue.

Fourth, the correlated anomaly detection system should be scalable to a large number of data sources and data sources of large volume. An operational network may potentially have thousands of devices which may easily yield data sources numbering in tens of thousands with each data source potentially having millions of data points. The tool may be required to generate reports on correlated anomalies occurring on these devices in near real-time. The exemplary embodiments also address this issue.

To address the above issues, the exemplary embodiments provide a system equipped with Synergy for the detection and diagnosis of correlated network anomalies. The system may use a suite of anomaly detection algorithms (e.g., EWMA, FFT, Holt-Winters, wavelets, etc.) and statistical and temporal join algorithms to detect correlated anomalies that have evidence in multiple data sources. The system may eliminate the dependency of domain knowledge and may minimize human involvement in network anomaly detection by automatically selecting optimal parameters that jointly minimize the overall false positive ratio and false negative ratio.

FIG. 1 shows a network 100 according to an exemplary embodiment. The network 100 may be a heterogeneous network which may include a plurality of computing devices utilizing a plurality of operating systems and/or protocols. The network 100 may be configured in any of the conventional manners such as having a topology forming a ring, a mesh, a star, a fully connected, a line, a tree, a bus, etc. The network 100 may further include a plurality of different types of networks such as a local area network (LAN), a wide area network (WAN), a wireless local area network (WLAN), a private area network (PAN), a virtual area network (VAN), etc. As illustrated in FIG. 1, the network 100 may include a server 105, a database 110, core routers 115, edge routers 120, and Synergy 130.

The server 105 may be conventional and provide respective functionalities for the network 100. The server 105 may be connected to the database 110 which may store data related to the network 100 such as security information related to end devices of the network 100. The network 100 may further include the core routers 115 and edge routers 120 to extend a coverage area of the network 100. The core routers 115 may be interconnected and the edge routers 120 may be connected to one or more core routers. It should be noted that the components of the network 100 are only exemplary. Those skilled in the art will understand that further components (e.g., network management arrangement, access points, etc.) may be included in the network 100, in particular as the network 100 may be a heterogeneous network.

The network 100 may include Synergy 130. As illustrated, Synergy 130 may be connected to the server 105. However, it should be noted that Synergy 130 may be connected to other components so that data may be accessed to detect and diagnose the correlated network anomalies according to the exemplary embodiments. In addition, it should be noted that Synergy 130 being disposed as a separate component is only exemplary. According to the exemplary embodiments, Synergy 130 may also be incorporated into the server 105 or other component of the network 100.

Figure 2:
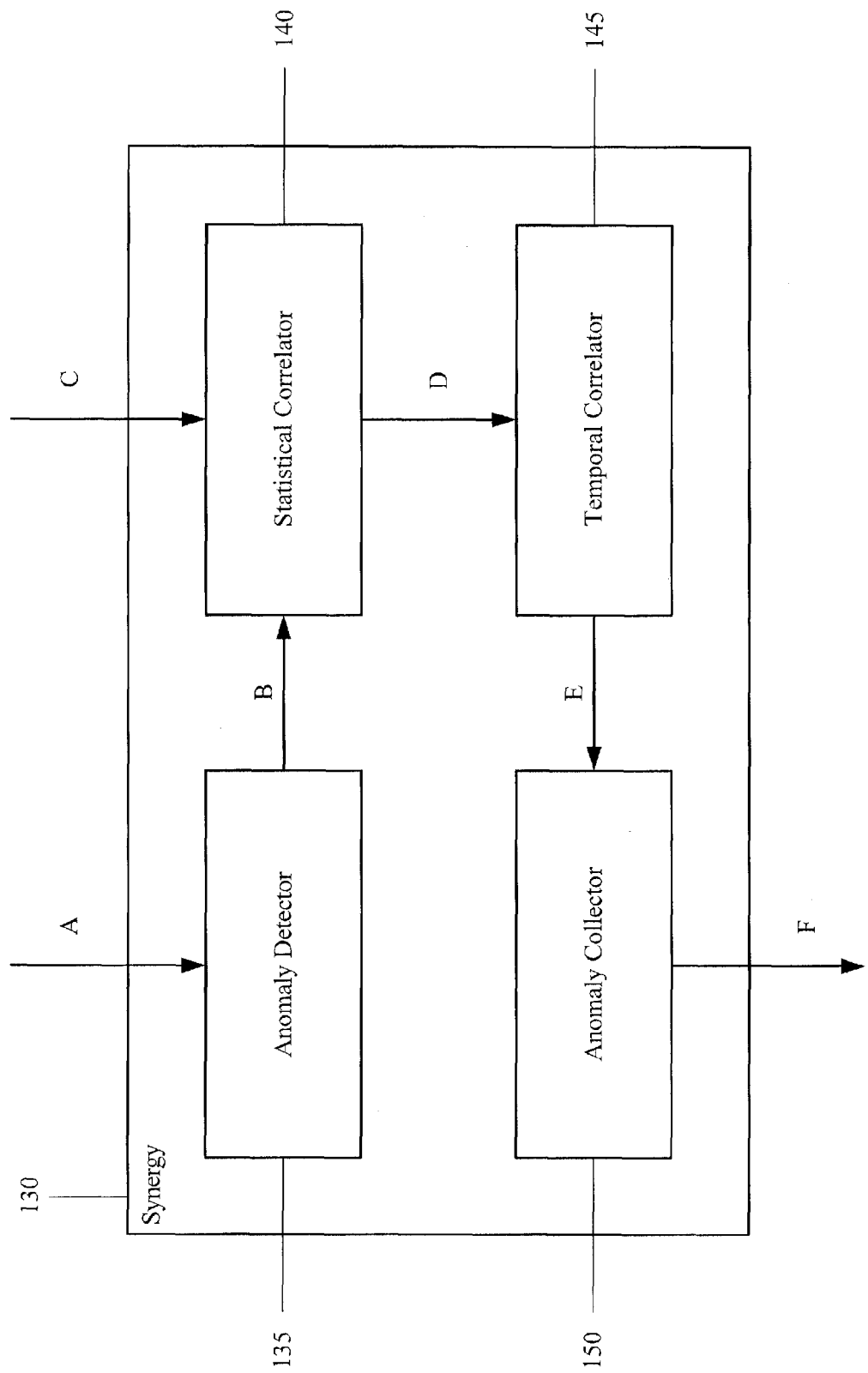
FIG. 2 shows a plurality of modules representing Synergy architecture according to an exemplary embodiment.

FIG. 2 shows a plurality of modules 135-150 representing an architecture for Synergy 130 according to an exemplary embodiment. The module 135 may be an anomaly detector. A data stream A may include event-series of interest. The event-series of interest may be a collection of data relating to the network 100 in which a determination is to be made whether at least one anomaly existed. The module 135 may execute a plurality of anomaly detection algorithms to generate a data stream B including an anomaly series. The algorithms will be discussed in further detail below. It should be noted that the anomaly series of the data stream B may include false alarms or may have missed considerable real anomalies.

The data stream B may be received by the module 140 which may be a statistical correlator. The module 140 may further receive a data stream C which may be another event-series. The module 140 may output a data stream D including an event-series with significant correlations. The data stream D be received by the module 145 which may be a temporal correlator. The modules 140 and 145 may enable Synergy 130 to prune the list of anomalies via correlation with the data stream C. The modules 140 and 145 may provide better control on the performance of Synergy 130 so that a great number of false alarms may be reduced or eliminated while few real correlated anomalies are not missed. The modules 140 and 145 also provide a means of diagnosing a root cause (i.e., event causing the anomaly) or impact (i.e., result of the anomaly) of a correlated anomaly. Those skilled in the art will understand that knowledge of an anomaly being correlated with an event in another data source provides information in determining the root cause.

The module 145 may output a data stream E including diagnosed anomalies. The data stream E may be received by module 150 which may be an anomaly collector. The module 150 may output a data stream F including a report of the diagnosed anomalies.

The anomaly detection algorithms may be executed by the module 135 on the data stream A. As a pre-processing step, information to be contained in the data stream A may be smoothed by averaging over a moving time window such as an hour long window. The pre-processing step may improve anomaly detection results by removing or eliminating measurement noise (e.g., insignificant variations, missed polls, etc.). Thus, the pre-processing step may generate the data stream A. The anomaly detection algorithms may then be run on module 135 to extract a residue signal that measures the deviation from the predicted behavior in each case. It should be noted that the anomaly detection algorithm may also be any that provides a residue signal of an overall (in contrast to individual) deviation of a real signal from an expected signal.

A first anomaly detection algorithm may be a Fast Fourier Transform (FFT). A signal may be converted into a frequency domain so that low-frequency components may be removed. For example, according to the exemplary embodiments, a threshold frequency may correspond to a time period such as one hour, thereby removing all periodic components that are greater than an hour. Upon narrowing the low-frequency components, the signal may be converted back to a time domain via an inverse FFT. A resulting high-frequency component may be a residue signal.

A second anomaly detection algorithm may be a wavelet analysis. According to the exemplary embodiments, a Daubechies wavelet of order 6 may be used to decompose a signal. All but the first three frequency levels of a decomposition may be removed before performing a wavelet recomposition procedure to obtain a residue signal.

A third anomaly detection algorithm may be an exponentially weighted moving average (EWMA) to model data based upon respective previous values. A prediction may be determined based upon a value of a signal at a time prior thereto. Weights may also be assigned to older values that are exponentially decreasing with age.

A fourth anomaly detection algorithm may be Holt-Winters (HW). Similar to EWMA, HW may model seasonal data (e.g., data that has time-of-day variation) based upon previous values. An optimal HW parameter may be fit to data from each router and a deviation may be reported form a predicted value as the residue.

Upon executing the above anomaly detection algorithms and identifying a residue signal in each case, thresholding may be applied to the residue signal to obtain a list of anomalies. Thresholding may be used to prevent restricting a length of anomalies that Synergy 130 identifies which selects the most significant anomalies implicitly requiring an assumption on the anomaly length. According to the exemplary embodiments, thresholds may be selected and anomalous intervals may be defined to be all intervals where the residue signal is greater than the threshold. Therefore, anomalies that are anywhere between tens of minutes to tens of hours in duration may be identified.

A further description of selecting thresholds according to the exemplary embodiments include selecting a threshold for each residue signal from the above described anomaly detection algorithms. A standard deviation may be computed or a root mean square error may be computed if the standard deviation does not have a zero mean. The residue signal may then be normalized by the standard deviation or root mean square error to determine a scale-independent signal. The threshold may then be applied to generate different sets of potential anomalies. Upon identifying a start and an end to an interval, when the residue signal is greater than the threshold, an anomalous event may be designated thereto. As will be described in further detail below, the anomalies may be identified by the start time to assist in identifying a root cause of the anomaly.

The data stream A being processed by the module 135 may generate the data stream B which is received by the module 140. At the module 140, to identify correlated network anomalies, co-occurring events in other network event-series is viewed. That is, the data stream C is received by the module 140 as well. An assumption at the module 140 for statistical correlation is that false alarms in an anomalous event-series typically do not correlate with false alarms in other data sources. If an event in anomalous event-series has no evidence in other data sources, then it may be assumed to be a false anomaly. However, there is a possibility of still having an anomaly as the co-occurrence based approach is incapable of differentiating between a genuine dependence and a co-occurrence by chance, which maintains false alarms to be generated. According to an exemplary embodiment, by first identifying genuine dependence between two event-series using pair-wise statistical correlations is performed. Second, a multi-variate temporal join approach may be applied to identify the co-occurrences between anomalous events and events in other network event-series that have strong statistical correlations with the anomalous event-series. A correlation infrastructure may be used to obtain a pair-wise statistical dependence between the anomalous event-series and other network event-series. A correlation result may be compared to a predetermined threshold confidence level to determine a significance of a co-occurrence. The exemplary embodiments may provide two approaches for computing statistically correlated event-series for an anomalous event-series.

First, a binary even-series correlation is hereby described. The binary correlation may be used when the anomaly detection outputs a binary sequence of events indicating the presence or absence of an anomaly. This approach enables the module 140 to not be required to know internals of the anomaly detector. The module 140 may indicate whether the presence of an anomaly event statistically co-occurs with other events.

Thresholding may be used to identify the significance of an anomaly. By using different anomaly detection thresholds, multiple anomaly event-series for statistical correlation may be created. Anomaly event-series at difference thresholds have a different signature of strongly correlated event-series. The exemplary embodiments enable multiple thresholds to be used and to pick a correct threshold that minimizes the false negative ratio while ensuring a low false positive ratio.

Second, a residue event-series correlation is hereby described. One way of overcoming an anomaly threshold selection is to operate on an intermediate transformation of event-series. This may be performed when Synergy 130 is aware of the internals of the detectors. For the above described algorithms (e.g., EWMA, FFT, HW, wavelets), Synergy 130 is aware that the algorithms decompose the original event-series into a normal signal and a residue signal. Thresholding is then used on the residue signal to identify the anomalies. In residue event-series correlation, the non-binary event-series in the residue is directly operated. The statistical correlation test indicates if there is any dependence between the anomalous event-series and other network event-series. An advantage to using the residue event-series correlation is that there is no requirement to apply thresholding.

Upon the module 140 performing the statistical correlations, the data stream D may be generated and the module 145 may perform a temporal correlation on the stream. After identifying a list of network event-series that have strong statistical correlations (via module 135), a per-event anomaly diagnosis may be performed to classify the anomaly as a genuine anomaly or a false alarm. For each event in the anomalous event-series, whether there is a temporal join is identified with events in other network event-series that have a strong statistical correlation. It should be noted that this identification may be pair-wise or multi-variate joins. If a temporal join exists, a correlated anomaly is marked or otherwise ignored. It may be assumed that the temporal join with the strongly correlated event-series is likely to present the root cause of the event.

Once the data stream D is diagnosed and analyzed at the module 145, the data stream E may be generated and received by the module 150. The anomaly collector (module 150) may combine anomaly detectors and the different approaches thereof for each detector to jointly optimize the false positive and false negative ratios. The module 150 may be responsible for (1) synergizing anomaly detection and correlation to prune the list of anomalies and (2) combining the correlated anomalies of each detector to present more meaningful results.

The anomaly detector (module 135) and the correlators (modules 140, 145) may be operated in a closed loop form where the anomalies detected by a detector and a specific detection threshold are fed into the correlator to identify statistical and temporal correlations and the temporal event joins are used to report the diagnosed anomalies. The anomaly detection threshold may control the number of false alarms and missed genuine anomalies. A very low anomaly detection threshold may generate a high rate of false alarms and a very high threshold may lead to missed genuine anomalies. The correlation significance threshold may determine the temporal joins for correlated network anomalies. Thus, the selection of thresholds must be carefully determined or a significantly inefficient process may result.

According to the exemplary embodiments, the module 150 may combine results from multiple detectors and detection thresholds to ensure lower false positives (at higher detection thresholds) and lower false negatives (at lower detection thresholds). The module 150 may take a union of the events in the anomalous event-series that have temporal joins with at least one of the strongly correlated event-series. The union operation may be performed across different anomaly detection thresholds as well as across different anomaly detection algorithms. The module 150 may be configured to, for example, combine two events in the anomalous event-series by taking a union of the time-stamps and then merging any overlapping ranges, if any.

As discussed above, the exemplary embodiments may diagnose and analyze multiple data sets. The data set may be obtained from a tier-1 ISP operational network. In particular, the data set may include SNMP performance measurements, routing events, router syslogs, and command logs that are collected over a period of time.

Regarding SNMP, the ISP may periodically (e.g., every five minutes) collect summary measurements such as packet counts, packet drops, router CPU utilizations, and memory utilizations. Regarding syslogs, commercial routers may log various error messages and events while performing respective functionalities. This may provide additional information not captured by the SNMP such as messages related to routing protocol sessions, route configuration changes, and router internal errors. Regarding router command logs, terminal access controller access-control system (TACACS) logs may provide a history of commands executed by network operators through a command line interface (CLI) on routers such as a state of routing protocols and rebooting a router. Regarding routing events, OSPF routing data may capture the OSPF link state advertisements (LSAs) that are indicative of network state changes such as router up/down, link up/down, and link metric updates.

According to exemplary embodiments, synergy 130 may provide reduced numbers of a false negative ratio. In particular, router CPU utilization anomalies may be viewed to determine an accuracy of the results generated through synergy 130. In a first accuracy determining factor, a synthetic simulation where ground truth apriori being known may be used. In a second accuracy determining factor, anomalies may be labeled using correlations across multiple data sources and evaluated using real data.

Network operators of the tier-1 ISP may categorize detected anomalies into three classes: red being of highest intensity, yellow being of middle intensity, and blue being of lowest intensity. The anomalies may be those determined by the modules 135-150 of synergy 130. The verification may provide a validation of whether the statistical correlations (module 140) and the temporal correlations (module 145) may inter-operate well with the anomaly detectors.

According to exemplary embodiments, synergy 130 may also provide reduced numbers of a false positive ratio without increasing the false negative ratio. In particular, synergy 130 may perform this feature by synergizing the anomaly detection and correlation. By comparing the number of anomalies output by each anomaly detection algorithm with the number of anomalies output by synergy 130, a measurement of the data reduction (i.e., narrowing of the ratios) may be determined. The data reduction percentages may be computed for (1) each individual detection algorithm after taking a union across all thresholds and (2) a union across all detection algorithms and thresholds. Total anomalies in each detection technique may be computed by first taking a union across anomalies at each detection threshold and then merging overlapping anomaly time-ranges.

Figure 3:
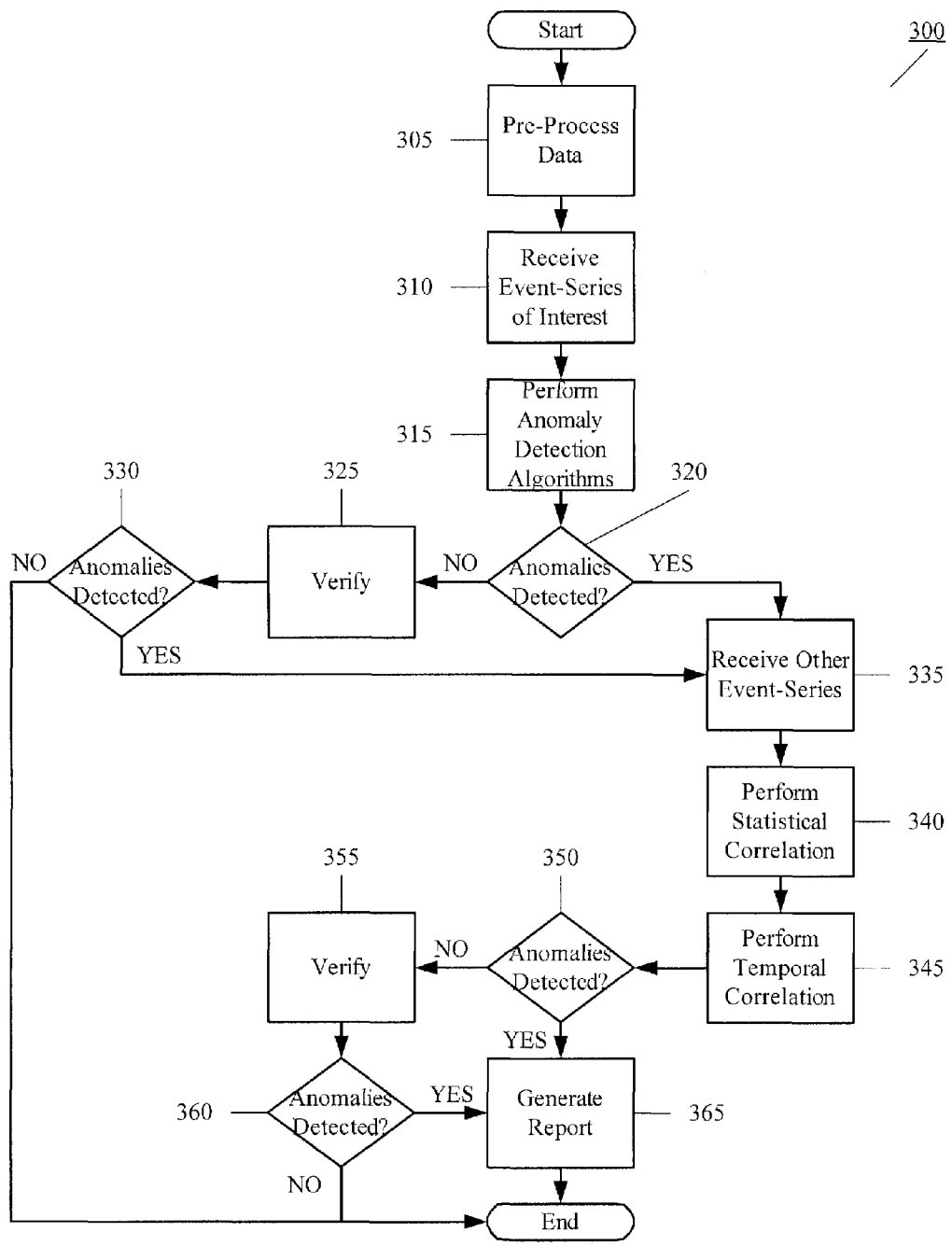
FIG. 3 shows a method for detecting and diagnosing correlated network anomalies according to an exemplary embodiment.

FIG. 3 shows a method 300 for detecting and diagnosing correlated network anomalies according to an exemplary embodiment. The method 300 will be discussed with reference to the network 100 of FIG. 1 and the modules 135-150 of synergy 130 of FIG. 2.

In step 305, a pre-processing step of raw data relating to the network may be performed. As discussed above, the pre-processing step may improve anomaly detection results by removing or eliminating measurement noise. In step 310, a resulting data stream from the pre-processing step may be received which includes event-series of interest. In step 315, the anomaly detection algorithms may be executed on the data stream including the event-series of interest. As discussed above, the anomaly detection algorithms may be performed at the first module 135 and may include FFT, wavelet analysis, EWMA, and HW.

In step 320, a determination is made whether anomalies are detected. As discussed above, upon executing the anomaly detection algorithms, a residue signal may be identified in each case. Thresholding may be applied to each residue signal to obtain a list of the anomalies. If no anomalies are detected, the method 300 continues to step 325 where a verification is performed. The verification may be, for example, performing the anomaly detection algorithms at different parameters. In step 330, another determination is made whether anomalies are detected. If no anomalies are again detected, the method 300 ends.

If step 320 determines that anomalies are detected, the method 300 continues to step 335 where a data stream including other event-series is received. Furthermore, if anomalies are detected at step 330, the method 300 may continue to step 335 as well. In step 340, a statistical correlation may be executed at the second module 140. In step 345, a temporal correlation may be executed at the third module 145. Using the data stream including the other-event series combined with the data stream generated from the detected anomalies (step 320 or 330), the correlations in steps 340 and 345 may be performed.

In step 350, a determination is made whether anomalies are detected. This determination may provide a reduction in a false positive ratio and/or a false negative ratio which may still be included from the prior data streams. If no anomalies are detected, the method 300 continues to step 355 where a verification is performed. The verification may be, for example, repeating the correlations of steps 340 and 345 at different parameters. In step 360, another determination is made whether anomalies are detected. If no anomalies are again detected, the method 300 ends.

If step 350 determines that anomalies are detected, the method 300 continues to step 365 where a report including the detected correlated anomalies is generated at the fourth module 150. Furthermore, if anomalies are detected at step 360, the method 300 may continue to step 365 as well so that any missed anomalies may be included in the report.

The exemplary embodiments may provide many advantages over existing techniques to detect and diagnose correlated network anomalies. In a first example, synergy 130 only reports truly correlated anomaly events which often reveal useful insights on a root-cause and impact of such events. In a second example, synergy 130 is more accurate because parameters are tuned for each individual data source in order to achieve the lowest overall false positive ratio and false negative ratio. In yet another example, using a join algorithm as discussed above, synergy 130 reduces a false alarm ratio significantly. In a third example, synergy 130 may be fully automated and may not require domain knowledge in detecting anomalies. In a fourth example, synergy 130 may be used in a large-scale deployment and run in real-time. In a fifth example, synergy 130 may also provide a paradigm for systematically evaluating performance on anomaly detection methods.

The exemplary embodiments may improve accuracy of anomaly detection and diagnosis. Synergy 130 eliminates a need for operations to fine-tune detector parameters. In contrast, synergy 130 may output a set of anomalous events that jointly minimize false positives and false negatives in a range of detection techniques and thresholds. Synergy 130 also provides a new approach to compare an accuracy of different anomaly detection techniques.

Those skilled in the art will understand that the above described exemplary embodiments may be implemented in any number of manners, including as a separate software module, as a combination of hardware and software, etc. For example, synergy 130 may be a program containing lines of code that, when compiled, may be executed on a processor of a module or incorporated component of the server 105.

It will be apparent to those skilled in the art that various modifications may be made in the present invention, without departing from the spirit or scope of the invention. Thus, it is intended that the present invention cover the modifications and variations of this invention provided they come within the scope of the appended claims and their equivalents.

What is claimed is:

1. A device to detect and diagnose an anomaly of a network, comprising:
   an anomaly detection module receiving a first data stream from a first data source including a first event-series related to the network, the anomaly detection module executing at least one algorithm to detect a potential anomaly in the first event-series; and
   a correlating module receiving, only if a potential anomaly is detected in the first event-series, a second data stream from a second data source including a second event-series related to the network, the second event series being independent from the first event series, the correlating module determining whether the potential anomaly is false, the correlating module further determining whether the potential anomaly is a true anomaly, wherein the correlating module does not receive the second data stream if no potential anomaly is detected in the first event-series.

2. The device of claim 1, further comprising:
   an anomaly collecting module optimizing at least one of a false positive ratio and a false negative ratio, the anomaly collecting module combining the true anomalies to generate a report.

3. The device of claim 1, wherein the correlating module includes a statistical correlator and a temporal correlator.

4. The device of claim 3, wherein the statistical correlator compares the potential anomaly in the first event-series with the second event-series related to the network.

5. The device of claim 4, wherein a common anomaly between the potential anomaly in the first event-series and the second event-series related to the network indicates the true anomaly.

6. The device of claim 3, wherein the temporal correlator compares the potential anomaly in the first event-series with the second event-series related to the network as a function of time to determine the true anomaly.

7. The device of claim 1, wherein the at least one algorithm includes at least one of a Fast Fourier Transform (FFT) analysis, a wavelet analysis, an exponentially weighted moving average (EWMA) analysis, and a Holt-Winters (HW) analysis.

8. The device of claim 1, wherein the anomaly detection module is further configured to pre-process raw data related to the network to generate the first event-series.

9. The device of claim 1, wherein the first event-series and the second event-series related to the network includes at least two data sources.

10. The device of claim 1, wherein the network is a heterogenous network.

11. A non-transitory computer readable storage medium including a set of instructions executable by a processor, the set of instructions performing a method comprising:
    receiving a first data stream from a first data source including a first event-series related to the network;
    executing at least one algorithm to detect a potential anomaly in the first event-series;
    receiving, only if a potential anomaly is detected in the first event-series, a second data stream from a second data source including a second event-series related to the network, the second event series being independent from the first event series;
    determining whether the potential anomaly is false; and
    determining whether the potential anomaly is a true anomaly.

12. The non-transitory computer readable storage medium of claim 11, wherein the method further comprises:
    optimizing at least one of a false positive ratio and a false negative ratio; and
    generating a report including the true anomaly.

13. The non-transitory computer readable storage medium of claim 11, wherein the method further comprises:
    comparing the potential anomaly in the first event-series with the second event-series related to the network.

14. The non-transitory computer readable storage medium of claim 13, wherein a common anomaly between the potential anomaly in the first event-series and the second event-series related to the network indicates the true anomaly.

15. The non-transitory computer readable storage medium of claim 11, wherein the method further comprises:
    comparing the potential anomaly in the first event-series with the second event-series related to the network as a function of time to determine the true anomaly.

16. The non-transitory computer readable storage medium of claim 11, wherein the at least one algorithm includes at least one of a Fast Fourier Transform (FFT) analysis, a wavelet analysis, an exponentially weighted moving average (EWMA) analysis, and a Holt-Winters (HW) analysis.

17. The non-transitory computer readable storage medium of claim 11, wherein the method further comprises:
    pre-processing raw data related to the network to generate the first event-series and the second event-series.

18. The non-transitory computer readable storage medium of claim 11, wherein the first event-series and the second event-series related to the network includes at least two data sources.

19. The non-transitory computer readable storage medium of claim 11, wherein the network is a heterogenous network.

20. A device to detect and diagnose correlated anomalies of a network, comprising:
    an anomaly detecting means for detecting a potential anomaly in a first event-series related to the network by executing at least one algorithm, the first event-series being included in a first data stream received from a first data source by the anomaly detecting means; and
    a correlating means for determining whether the potential anomaly is false and for determining whether the potential anomaly is a true anomaly, the correlating means receiving, only if a potential anomaly is detected in the first event-series, a second data stream from a second data source including a second event-series related to the network, the second event series being independent from the first event series, wherein the correlating means does not receive the second data stream if no potential anomaly is detected in the first event-series.

* * * * *